(12) United States Patent
Höser et al.

(10) Patent No.: US 7,487,786 B2
(45) Date of Patent: Feb. 10, 2009

(54) SHAVER CLEANING APPARATUS

(75) Inventors: Jürgen Höser, Neu Anspach (DE);
 Diana Kappes, Eppstein (DE); Andreas Larscheid, Kelkheim-Fischbach (DE);
 Uwe Ludäscher, Frankfurt (DE);
 Svatopluk Krumnikl, Kronberg (DE)

(73) Assignee: Braun GmbH, Kronberg (DE)

( * ) Notice: Subject to any disclaimer, the term of this patent is extended or adjusted under 35 U.S.C. 154(b) by 814 days.

(21) Appl. No.: 10/935,828

(22) Filed: Sep. 8, 2004

(65) Prior Publication Data
 US 2005/0034313 A1  Feb. 17, 2005

Related U.S. Application Data

(63) Continuation of application No. PCT/EP02/12887, filed on Nov. 18, 2002.

(30) Foreign Application Priority Data
 Mar. 8, 2002 (DE) ................ 102 10 351

(51) Int. Cl.
 *B08B 3/00* (2006.01)
(52) U.S. Cl. ................ 134/166 R; 134/104.2; 134/201; 134/192

(58) Field of Classification Search .............. 134/104.2, 134/166 R, 192, 201
 See application file for complete search history.

(56) References Cited

U.S. PATENT DOCUMENTS

| 3,822,874 | A | * | 7/1974 | Snyder et al. | ................ 267/156 |
| 5,649,556 | A | | 7/1997 | Braun | |
| 7,107,692 | B2 | * | 9/2006 | Kappes et al. | ................ 30/538 |

FOREIGN PATENT DOCUMENTS

DE  44 02 237  9/1995

* cited by examiner

*Primary Examiner*—Michael Barr
*Assistant Examiner*—Jason Heckert
(74) *Attorney, Agent, or Firm*—Fish & Richardson P.C.

(57) ABSTRACT

A lift mechanism for a cleaning device of a dry shaving apparatus includes a base plate with guides and a chassis plate mounting the chassis and arranged for displacement relative to the base plate. Coiled-strip springs arranged on the guides spring-load the chassis plate against the base plate. On actuation of the lift mechanism the coiled-strip springs are untensioned by coiling up along the guides, thereby lifting the chassis plate. The coiled-strip springs reduce the load on the construction and ensure an almost noiseless lift mechanism.

30 Claims, 5 Drawing Sheets

SHAVER CLEANING APPARATUS

CROSS-REFERENCE TO RELATED APPLICATIONS

This is a continuation of PCT application Ser. No. PCT/EP02/12887, filed Nov. 18, 2002, which claims priority to German Patent Application No. 102 10 351.8, filed on Mar. 8, 2002, which is incorporated herein by reference in its entirety.

TECHNICAL FIELD

This invention relates to a cleaning device of a dry shaving apparatus, with a base plate and a chassis arranged for displacement relative to the base plate, and a spring adapted to be secured therebetween.

BACKGROUND

A cleaning device of this type is known from the appliance of the Braun company sold under the name "Clean & Charge". This cleaning device includes a housing into which the dry shaving apparatus is inserted for cleaning purposes. This involves receiving the shaving head of the shaving apparatus in a receptacle designed as a cleaning bath. The housing further accommodates a reservoir containing a cleaning fluid. To clean the shaving head the cleaning fluid is fed from this reservoir into the receptacle. In the receptacle the cleaning fluid is caused to contact the shaving head in order to remove the hair dust collected in the shaving head. From the receptacle the cleaning fluid flows back into the reservoir, entraining with it the removed hair dust. The principle of operation of such a cleaning device is known, for example, from DE 44 02 237 C2. Considering that the effect of the cleaning fluid weakens with the number of cleaning processes increasing, it is necessary to substitute fresh cleaning fluid after a certain number of cleaning cycles. For this reason, the reservoir for the cleaning fluid is of the replaceable type. To replace the cleaning fluid reservoir, the housing of the cleaning device is opened by means of a lift mechanism, enabling the previous reservoir to be removed and a reservoir containing fresh cleaning fluid to be substituted. For this purpose, the cleaning device is divided into a base plate and a chassis.

The chassis is comprised of a chassis plate and the chassis proper. The base plate has guides for the spiral springs, said spiral springs being biased towards the chassis plate with the cleaning device in closed condition. Through a button provided on the outside of the housing the locked relationship between chassis and base plate is canceled and the lift mechanism is activated. The three spiral springs are untensioned and lift the chassis, thereby releasing the cleaning fluid reservoir for replacement. After the reservoir is replaced, the chassis is pushed down against the base plate, locking onto it at the same time. With the downward movement of the chassis the spiral springs are tensioned. Owing to the long opening travel of the housing it is necessary for the spiral springs to have a long spring excursion. At the same time the spiral springs have to hold the chassis securely in open condition. This necessitates relatively high forces for closing the housing and simultaneously tensioning the spiral springs. Moreover, these forces have a particularly strong effect also in closed condition because the spiral springs have a progressive spring characteristic. This puts a considerable strain on the structure of the cleaning device. Furthermore, the abrupt beginning and the abrupt end of the opening movement at a stop is accompanied by loud noise. On account of the long spring excursion the spiral springs are guided. On actuation of the lift mechanism the spiral springs come into contact with the guides, which likewise leads to a not insubstantial noise level.

It is therefore an object of the present invention to provide a cleaning device with a lift mechanism that operates as smoothly as possible, develops minimum possible noise while being of straight-forward construction, and puts little strain on the structure of the cleaning device.

SUMMARY

According to the present invention this object is accomplished by providing the lift mechanism with at least one coiled-strip spring. The chassis is spring-loaded against the base plate by the coiled-strip spring. With the cleaning device in closed condition, the coiled-strip spring is uncoiled. Actuation of the lift mechanism releases the chassis, which is then moved by the relaxing coiled-strip spring coiling up in the process. An advantage of a coiled-strip spring made of strip steel is its nearly linear spring characteristic and its almost noiseless operation. In addition, owing to the coiling motion impact-type contact with other components or with itself is prevented from occurring during both coiling up and uncoiling, but rather, the chassis is lifted at a relativity constant speed through the entire stroke travel. The coiled-strip spring hence can enable a substantially quieter lift mechanism. Moreover, the coiled-strip spring can reduce the load on the chassis so that the construction has to withstand less severe stresses, strains and loads. The provision of a suitable arrangement can render the coiled-strip spring, which coils up when the cleaning device is opened, invisible to the user. Therefore an additional surface treatment or encapsulation of the coiled-strip spring to enhance its appearance can be avoided.

Preferably, the base plate has at least one guide that supports the movement of the chassis. Apart from one guide disposed centrally on the base plate, the arrangement of several guides on the circumference of the base plate may also be considered. Arranging the guides on the circumference has the advantage that sufficient space is available in the center of the base plate for the cleaning fluid reservoir and other built-in components. Canting of the chassis plate is avoided if guide bushings having a long guide length are provided on the chassis.

This guide may be constructed at the same time as a guide for one or several coiled-strip springs. The use of two coiled-strip springs for each guide, referred to as twin coiled-strip springs, is advantageous in this connection. The arrangement of two coiled-strip springs allows the use of small springs, and also enables the symmetrical arrangement of the coiled-strip springs on a guide, which largely eliminates the risk of canting the chassis during the opening movement.

It is suitable to design two coiled-strip springs (twin coiled-strip springs) as a one-piece construction. In this design each end of a U-shaped length of strip steel is formed as a coiled-strip spring, with the two springs coiling up or uncoiling in outward direction. This enables both coiled-strip springs to be arranged on the guide with a single fastening. As a result, the number of single parts is reduced while at the same time the assembly is simplified. The coiled-strip springs may be fastened to the guide by frictional as well as positive engagement using, for example, screws, clips or rivets.

In another aspect the lift mechanism includes elements that slow down the movement of the chassis during opening of the cleaning device until the end position is reached. This can result in a noiseless opening movement, since the chassis is prevented from striking hard against a stop limiting the opening movement. Furthermore, decelerating the lift mechanism has a wear-reducing effect.

The elements for the decelerated lift mechanism can be elastic elements arranged either on the guide, the base plate or the chassis. The elastic elements may be spring, rubber, foam or other plastic parts which are moved against a stop. In this context, springs are advantageous because they allow slowing down of the lift mechanism through a relatively long travel. The stop may be arranged on the chassis as well as on the guides, preferably at the end remote from the base plate. Ease of assembly is accomplished by fastening the stop or the spring to the guide together with the coiled-strip spring. The use of spring clips is particularly suitable in this connection. These clips enable the fastening of the coiled-strip springs in addition to providing one or several springs for slowing down the opening movement of the chassis plate just before reaching the end position.

In another embodiment with the spring clips, the springs are bending springs cooperating each with a ramp disposed on the chassis. By suitably selecting the incline of the ramp a wide variety of different deceleration characteristics can be set. Thus a minor incline of the ramp results in a slow deceleration of the opening movement, while a major incline of the ramp produces a rapid deceleration. By varying the inclination over the distance to be covered it is possible to obtain combinations of the two decelerations. Thus it can be considered to provide the ramp initially with a small incline, which results in only a slow deceleration of the opening movement. As the chassis plate continues its approach to the end position, the ramp's incline increases, leading to a progressively increasing deceleration of the opening movement up to a complete stop. With suitable selection of the ramp design it is thus possible to set the end position in a defined manner. In this instance no additional stop for the lift mechanism is necessary.

Further objects, features, advantages and application possibilities of the present invention will become apparent from the subsequent description of the embodiments. It will be understood that any single feature or any combination of single features described or represented by illustration form the subject-matter of the present invention, irrespective of their summary in the claims or their back-references.

BRIEF DESCRIPTION OF DRAWINGS

An embodiment of the present invention will be described in the following. In the drawing.

DETAILED DESCRIPTION

Figure 1:
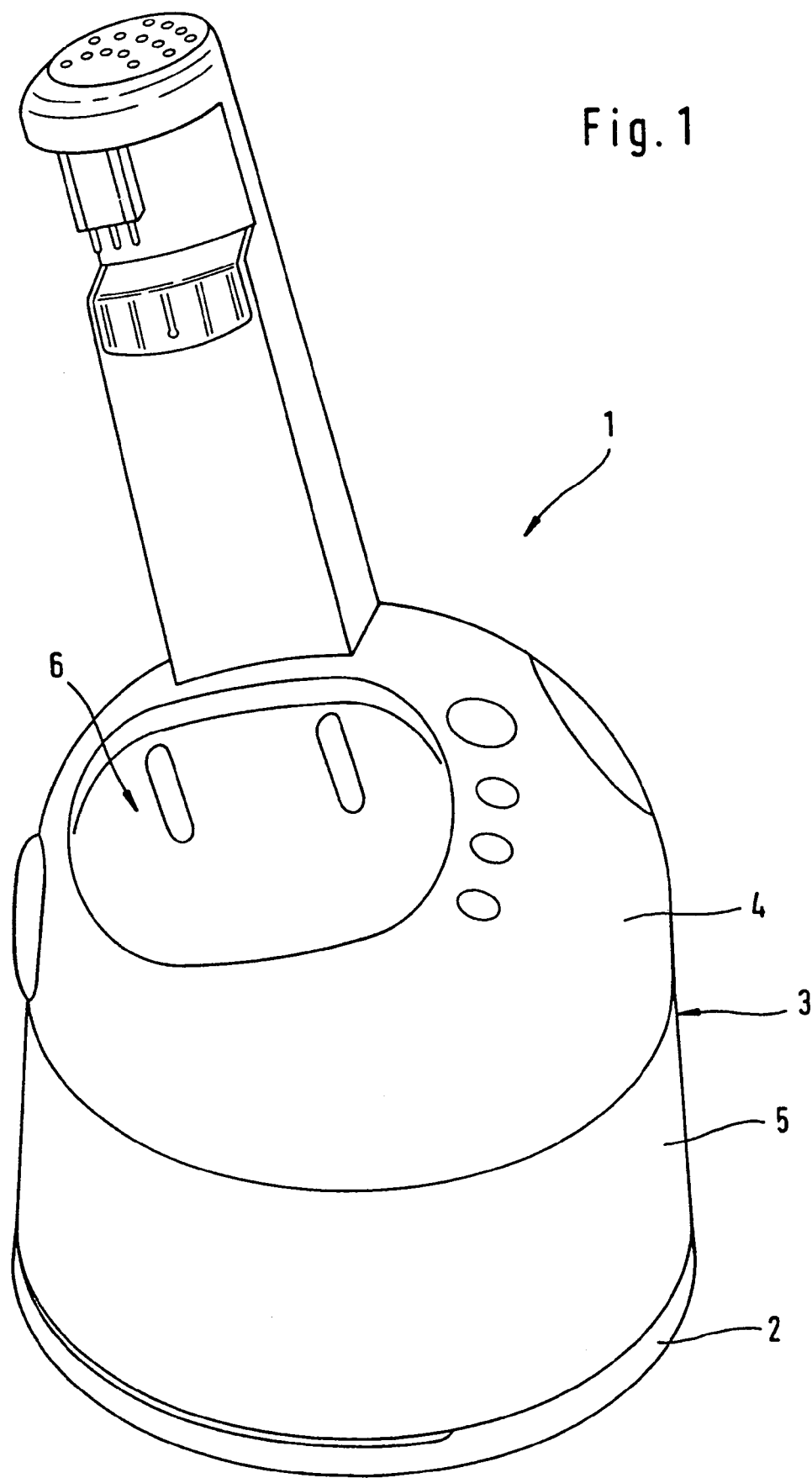
FIG. 1 is a schematic view of a cleaning device.

The cleaning device 1 shown in FIG. 1 is comprised of a base plate 2 and a chassis 3. The chassis 3 is composed of two housing parts 4, 5. The shaving head of a dry shaving apparatus, not shown, is insertable into an opening 6. Arranged underneath the chassis 3 are the devices needed for cleaning the dry shaving apparatus, such as the reservoir and the pump for the cleaning fluid and the lift mechanism.

Figure 2:
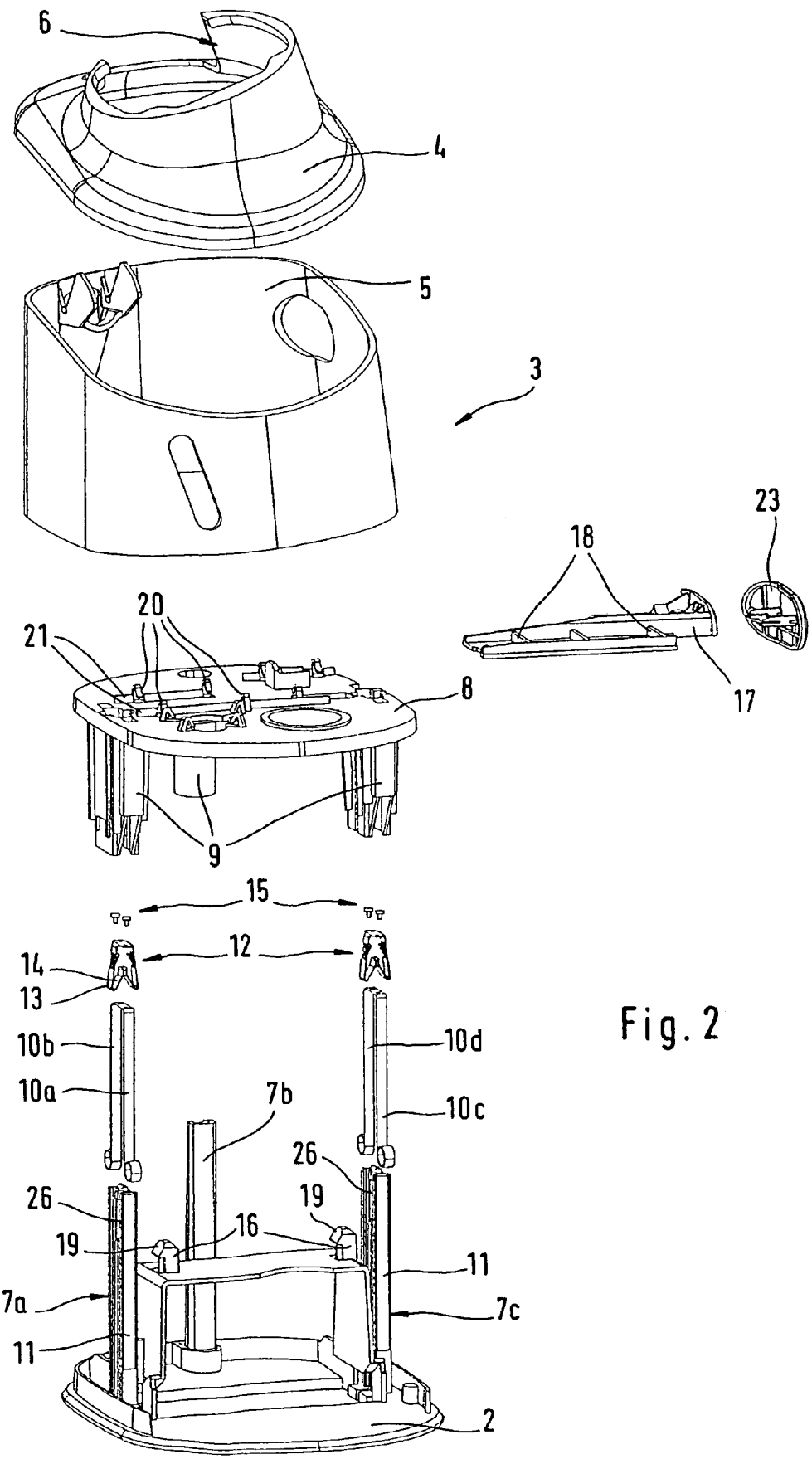
FIG. 2 is an exploded view of the lift mechanism of the cleaning device.

The lift mechanism shown in greater detail in FIG. 2 comprises the base plate 2 from which three guides 7a-c extend in upward direction. Slidably arranged along the guides 7a-c is a chassis plate 8. To avoid canting of the chassis plate 8, the chassis plate 8 includes three guide bushings 9. The chassis plate 8 mounts the housing parts 4, 5 of the chassis 3. Arranged on each of the guides 7a, 7c are two coiled-strip springs 10a-d which are able to coil up and uncoil along a guideway 11. Each pair of coiled-strip springs 10a, b; 10c, d, bent in a U-shaped configuration, are integrally connected with each other and fastened to the upper end of the respective guide 7a, 7c together with a respective spring clip 12 by two screws 15. The spring clips 12 have two laterally arranged cantilevered portions 13 with inwardly bent tongues 14 supporting each other. For this purpose the guides 7a, 7c have a respective recess 26 at the appropriate level. The tongues 14 may also be supported by corresponding surfaces of the guides 7a, 7c. Arranged on the base plate 2 on a bridge are two detent hooks 16 which cooperate with a detent slide 17 to lock the chassis 3 onto the base plate 8 when the lift mechanism is in a retracted condition. The detent slide 17 has several detent bars 18 for engagement with the detent hooks 16. To connect the detent slide 17 to the chassis plate 8, hooks 20 are provided on the chassis plate's upper side. Shaped elements 21 disposed between the hooks 20 provide a guide for the detent slide 17. A return spring 22 (FIG. 3), likewise secured to the chassis plate 8, effects movement of the detent slide 17 into a predetermined initial position.

Figure 3:
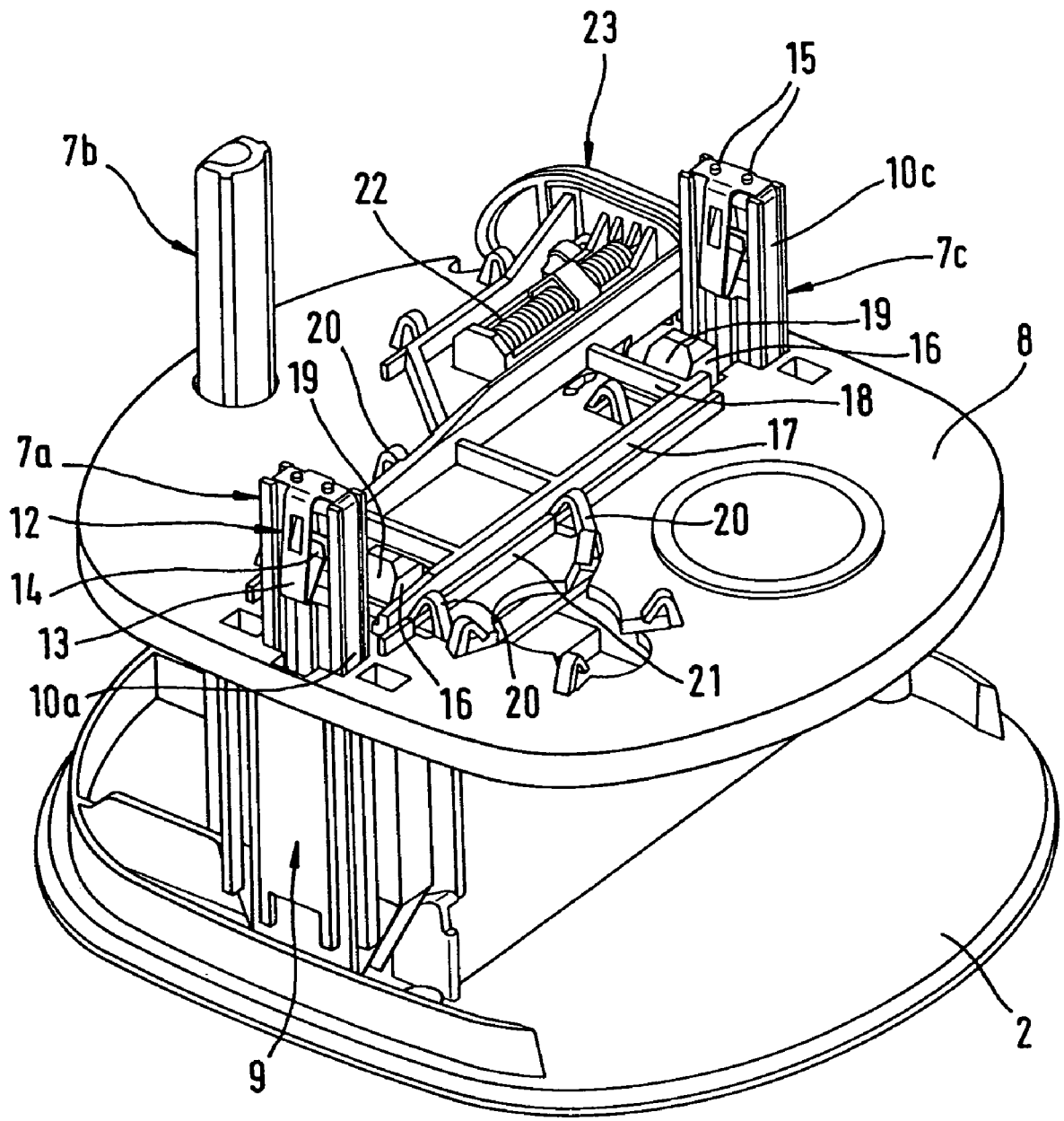
FIG. 3 is a perspective view of the lift mechanism in retracted condition.

FIG. 3 shows the chassis plate 8 in its retracted condition in which it is locked onto the base plate 2. In this condition the detent bars 18 engage behind the detent hooks 16. Together with the spring clips 12 the coiled-strip springs 10 are snap-locked on the guides 7a, 7c or secured thereto by screws. With the chassis plate 8 locked in place, the coiled-strip springs 10 are tensioned due to uncoiling. The ends of the coiled-strip springs 10 are arranged within the guide bushings 9. Operation of the actuating element 23 causes the detent slide 17 to be displaced along the shaped elements 21 in opposition to the return spring 22. As this displacement occurs, the detent bars 18 are no longer in engagement with the detent hooks 16, and the lift mechanism operates to cause the chassis plate 8 to be moved upwards along the guides 7a-c. After the actuating element 23 is released, the detent slide 17 is moved back to its initial position by the return spring 22. The upward movement of the chassis plate 8 is effected by the coiled-strip springs 10. The cleaning device 1 is thus open. To close the cleaning device 1, the chassis 3 and chassis plate 8 are together moved downwards manually. During the downward movement of the chassis plate 8 the detent bars 18 of the detent slide 17 engage the detent hooks 16. Lateral chamfers 19 on the upper side of the detent hooks 16 effect displacement of the detent slide 17 against the return spring 22 as the chassis plate 8 continues its downward movement. Once the chassis plate 8 is displaced downwards such a distance that the detent bars 18 are underneath the detent hooks 16, the return spring 22 moves the detent slide 17 back into its initial position whereby the detent bars 18 engage behind the detent hooks 16. The chassis plate 8 is thus again locked onto the base plate 2, and the cleaning device 1 is closed. The audible locking action as the result of return spring 22 causing the detent bars 18 to strike against the detent hooks 16 is at the same time an audible signal informing the user of the cleaning device 1 that the lift mechanism is locked in place and the cleaning device closed.

Figure 4:
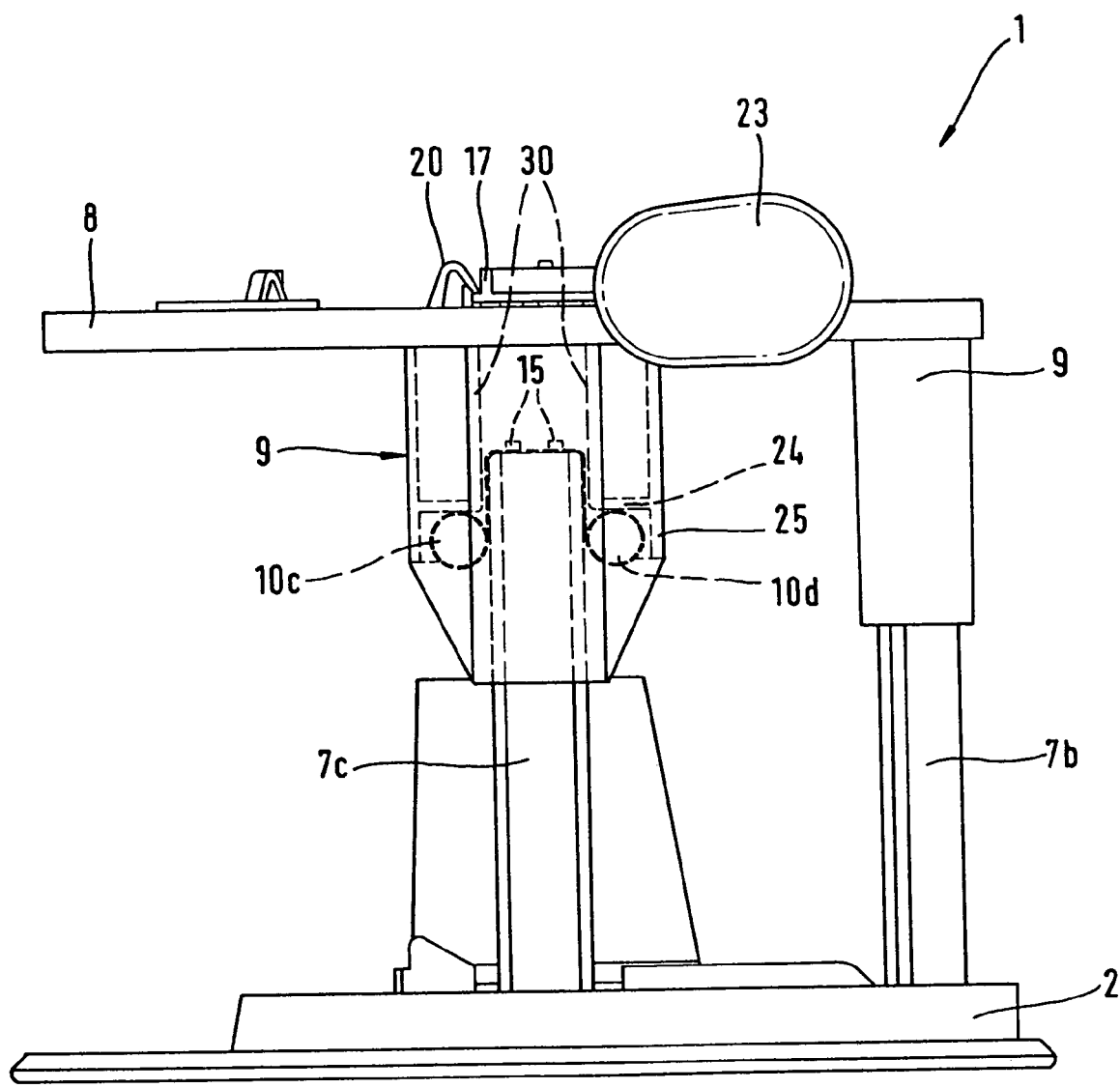
FIG. 4 is a side view of the lift mechanism in open condition.

The open cleaning device 1 is shown in FIG. 4. Guide bushings 9 formed on the chassis plate 8 receive the guides 7 of the base plate 2. By means of suitable snap-locks and/or screws 15, a spring clip 12 and the coiled-strip springs 10c, 10d are fastened to the guide 7c. The two coiled-strip springs 10c, 10d are bent in a U-shaped configuration and embrace the guide 7c. The coiled up ends of the coiled-strip springs 10c, 10d rest each against a respective stop 24 of the guide bushing 9, thus spring-loading the chassis plate 8 against the base plate 2. In the end position shown, the coiled-strip springs 10 are not completely untensioned, but possess sufficient bias to reliably hold the chassis plate 8 in the end position. The guide bushing has two masking plates 25 arranged in front of the coiled up ends of the coiled-strip springs 10. These masking plates 25 protect the coiled-strip springs in addition to providing a sightproof guard so that that the coiled-strip springs 10 are not visible to the user when the cleaning device 1 is open. For closing the cleaning device 1, the coiled up ends of the coiled-strip springs 10 are urged downwardly by the stops 24, causing the ends to uncoil. The coiled-strip springs 10 are thereby tensioned. The coiled-strip springs 10 are constructed in such a way that the ends are coiled up in closed condition, that is, as shown in FIG. 3, in order to ensure reliable contact with the stops 24. On actuation of the lift mechanism the guide bushings 9 slide with sliding surfaces 30 against the coiled-strip springs 10.

Figure 5:
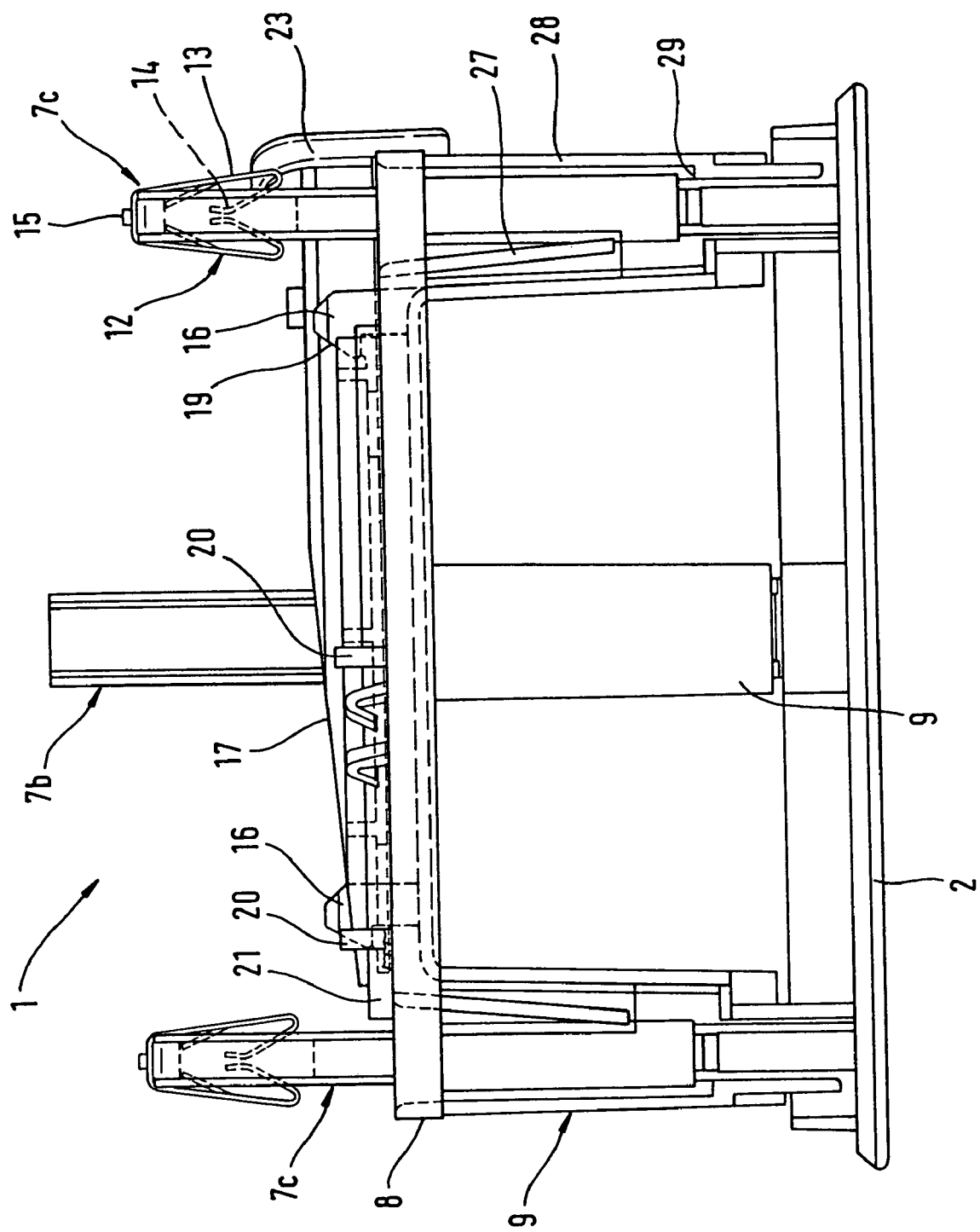
FIG. 5 is a side view of the guide of FIG. 4.

FIG. 5 is a sectional view of the guide in its closed condition. In this view the chassis plate 8 is locked onto the base plate 2. The spring clip 12 connected with the guide 7c has two lateral cantilevered portions 13 with inwardly bent ends 14 which extend into the recess 26 in the guide 7c. Arranged in the guide bushing 9 is a ramp 27. The ramp 27 is arranged in such a manner that its distance to the guide 7c is progressively reduced from top to bottom. Opposite the ramp 27, the guide bushing 9 has a limit stop 28 extending parallel to the guide 7c. At the lower end the limit stop 28 has an inwardly extending shoulder 29. The attenuation of the lift mechanism just before reaching the end position will be described below.

As the chassis plate 8 is moved upwards, the ramp 27 strikes the cantilevered portion 13. In continuation of this movement, the cantilevered portion 13 is bent inwardly. The end 14 is also deflected inwardly until it meets the opposite end 14, urging it against the limit stop 28 of the guide bushing 9. On account of this elastic deformation of the spring clip 12 the upward movement of the lift mechanism is slowed down. With an appropriate design of the ramp and the spring clip 12 deceleration of the lift mechanism and the end position of the chassis plate 8 can be set arbitrarily within wide limits. Thus, it can be considered to design the limit stop 28 likewise as a ramp. In the present case the end position is produced by positive engagement when the shoulder 29 formed in the guide 9 meets the right-hand cantilevered portion 13 of the spring clip 12.

The invention claimed is:

1. A shaver cleaner comprising
a base plate;
a chassis defining an opening sized to receive a shaving head of a shaver to be cleaned, the chassis secured to the base plate and movable with respect to the base plate between a first position and a second position in which an interior of the shaver cleaner is accessible between the chassis and base plate; and
a spring secured between the chassis and base plate and arranged to bias the chassis toward the second position, wherein the spring comprises a coiled-strip spring; and
wherein the shaver cleaner is configured to clean a shaving head received in the opening.

2. The shaver cleaner of claim 1, wherein the base plate includes a guide arranged to position the chassis with respect to the base plate as the chassis is moved between the first and second positions.

3. The shaver cleaner of claim 2, wherein the guide defines a channel along which the coiled-strip spring winds and unwinds as the chassis is moved.

4. The shaver cleaner of claim 3, wherein an outer portion of the coiled-strip spring is secured to the base plate at a distal end of the channel.

5. The shaver cleaner of claim 4, wherein the spring is secured to the base plate by frictional engagement.

6. The shaver cleaner of claim 4, further comprising a fastener securing the spring to the base plate.

7. The shaver cleaner of claim 6, wherein the fastener comprises a spring clip.

8. The shaver cleaner of claim 1, comprising two coiled-strip springs secured between the chassis and base plate and arranged to mutually bias the chassis toward the second position.

9. The shaver cleaner of claim 8, wherein the two springs are integral portions of a single strip of material.

10. The shaver cleaner of claim 1, further comprising a stop arranged to limit motion of the chassis in the second position.

11. The shaver cleaner of claim 1, further comprising means to decelerate the chassis as it is moved toward the second position by spring force.

12. The shaver cleaner of claim 11, wherein said deceleration means comprises an elastic element arranged to be resiliently deformed as the chassis approaches the second position.

13. The shaver cleaner of claim 12, wherein said elastic element comprises a spring.

14. The shaver cleaner of claim 12, wherein the elastic element is arranged to engage a ramp as the chassis approaches the second position.

15. The shaver cleaner of claim 14, wherein the ramp defines a variable incline.

16. The shaver cleaner of claim 14, wherein the ramp defines a constant incline.

17. The shaver cleaner of claim 1, further comprising a releasable latch configured to secure the chassis in the first position.

18. The shaver cleaner of claim 1, further comprising a cleaning fluid reservoir exposed for access by motion of the chassis to the second position.

19. The shaver cleaner of claim 18, wherein said reservoir is removable from the cleaner for replacement.

20. The shaver cleaner of claim 1, wherein the chassis is disposed above, and supported by, the base plate.

21. The shaver cleaner of claim 1, comprising two opposing pairs of coiled-strip springs.

22. The shaver cleaner of claim 21, wherein the pairs of springs are disposed on either side of a cleaning fluid reservoir exposed for access by motion of the chassis to its open the second position.

23. The shaver cleaner of claim 1, wherein the coiled-strip spring comprises strip steel.

24. A shaver cleaner comprising
a base plate;
a chassis defining an opening sized to receive a shaving head of a shaver, the chassis movable with respect to the base plate between a first position and a second position in which an interior of the shaver cleaner is accessible between the chassis and base plate; and
a coiled-strip spring arranged to bias the chassis toward the second position;

wherein the shaver cleaner is configured to clean a shaving head received in the opening;

wherein the base plate includes a guide arranged to position the chassis with respect to the base plate as the chassis is moved between the first and second positions, the guide defining a channel along which the coiled-strip spring winds and unwinds as the chassis is moved; and wherein an outer portion of the coiled-strip spring is secured to the base plate at a distal end of the channel by frictional engagement.

25. A shaver cleaner comprising a base plate;

a chassis defining an opening sized to receive a shaving head of a shaver, the chassis movable with respect to the base plate between a first position and a second position in which an interior of the shaver cleaner is accessible between the chassis and base plate; and two coiled-strip springs that are integral portions of a single strip of material and are secured between the chassis and base plate and arranged to mutually bias the chassis toward the second position;

wherein the shaver cleaner is configured to clean a shaving head received in the opening.

26. A shaver cleaner comprising a base plate;

a chassis defining an opening sized to receive a shaving head of a shaver, the chassis movable with respect to the base plate between a first position and a second position in which an interior of the shaver cleaner is accessible between the chassis and base plate;

a coiled-strip spring arranged to bias the chassis toward the second position; and means to decelerate the chassis as it is moved toward the second position by spring force;

wherein the shaver cleaner is configured to clean a shaving head received in the opening.

27. The shaver cleaner of claim 11, wherein said deceleration means comprises an elastic element arranged to be resiliently deformed as the chassis approaches the second position.

28. The shaver cleaner of claim 12, wherein said elastic element comprises a spring.

29. The shaver cleaner of claim 12, wherein the elastic element is arranged to engage a ramp as the chassis approaches the second position.

30. A shaver cleaner comprising a base plate;

a chassis defining an opening sized to receive a shaving head of a shaver, the chassis movable with respect to the base plate between a first position and a second position in which an interior of the shaver cleaner is accessible between the chassis and base plate;

a coiled-strip spring arranged to bias the chassis toward the second position; and a cleaning fluid reservoir removable from the cleaner for replacement and exposed for access by motion of the chassis to the second position;

wherein the shaver cleaner is configured to clean a shaving head received in the opening.

* * * * *